United States Patent [19]

Merz

[11] 4,063,755
[45] Dec. 20, 1977

[54] COMPENSATORS OR EXPANSION JOINTS

[76] Inventor: Gunther Merz, Buchenring 6, 6078 Zeppelinheim, Germany

[21] Appl. No.: 609,664

[22] Filed: Sept. 2, 1975

[30] Foreign Application Priority Data

Sept. 20, 1974 Germany .............................. 2445055

[51] Int. Cl.$^2$ ............................................ F16L 11/12
[52] U.S. Cl. ...................................... 285/53; 138/149; 285/55; 285/236
[58] Field of Search ................. 285/236, 47, 48, 50, 285/55, 53, 229, 235, 149; 138/124, 127, 137, 138, 149

[56] References Cited

U.S. PATENT DOCUMENTS

| 3,030,250 | 4/1962 | Losse | 285/53 X |
| 3,346,016 | 10/1967 | Blau et al. | 138/149 X |
| 3,460,856 | 8/1969 | Van Tine et al. | 285/236 X |
| 3,768,523 | 10/1973 | Schroeder | 138/149 X |
| 3,874,711 | 4/1975 | Scalzo | 285/236 |

FOREIGN PATENT DOCUMENTS

| 2,092,992 | 1/1972 | France | 285/229 |
| 2,125,949 | 5/1971 | Germany | 285/236 |
| 1,273,929 | 6/1964 | Germany | 285/229 |
| 1,928,977 | 6/1969 | Germany | 138/149 |

Primary Examiner—Dave W. Arola
Attorney, Agent, or Firm—Lane, Aitken, Dunner & Ziems

[57] ABSTRACT

A compensator of pliable material for establishing a flexible joint in a pipe, comprising at least one flexible layer of fabric material cooperating with a sealing element of limitedthermal stability. A layer of flexible steel foil is disposed between the sealing element and at least one thermally and/or chemically stressed side of the compensator.

7 Claims, 4 Drawing Figures

COMPENSATORS OR EXPANSION JOINTS

BACKGROUND OF THE INVENTION

This invention relates to expansion joints or so-called compensators for establishing flexible joints in pipes, conduits, ducting and the like, hereinafter referred to simply as pipes. Such compensators may comprise a sealing element of plastics or rubber, having limited thermal resistance, and one or more flexible layers of textile or like material.

Known compensators of this nature are usually assembled from several layers of asbestos fabric and/or other industrial fabric, in which a sheet or foil of polytetrafluoroethylene (PTFE) is embedded in order to obtain the required gas-tightness. In thermal load-bearing capacity and also in cost incurred, such compensators of pliable material lie between the also-known steel compensators and rubber compensators. Steel compensators, which are welded up from steel sheets and are self-supporting, are primarily appropriate for high pressures and also for liquid fluids. Their high cost, however, precludes their application from many uses and, furthermore steel compensators have a relatively very low degree of flexibility. On the other hand, rubber compensators are satisfactory if the pipe cross-sections are circular and if they can be produced in bulk. The thermal resistance is low, however, and rubber compensators are also unsuitable for many purposes because of their lack of chemical resistance.

In a compensator of pliable material, the sealing element functionally represents the essential component. It is the principal purpose of the flexible layers of fabric material to protect the sealing element which usually consists of a sheet of PTFE, aluminium, or lead, against temperature, pressure, and mechanical stress, without the desirable flexibility of the compensator being lost. At the present time, asbestos and/or synthetic fabrics may be considered as materials which combine flexibility, thermal stability and chemical imperviousness, to the degree required for most purposes. Fabrics of this nature tend to decay, however, for example in cases where there is substantial condensation. Also, in installing the pipe systems, the fabric may be damaged since it is the external layer of the compensator. Moreover, the fabrics may not protect the sealing elements adequately in cases of intermittent thermal loads from inside, the fluid side, or arising from external heat radiation. In such cases the compensators may leak.

It has already been proposed in German Pat. No. 1,273,929 to eliminate the above shortcomings of conventional compensators of pliable material by making provision for high thermal stability in the sealing element itself. In this proposal, a self-supporting steel sheet insert having a thickness of up to 0.2 mm was incorporated as a sealing element which was inserted between the fabric layers directly exposed to hot gas. Practice showed that the sheet or foil thickness should not lie appreciably below 0.2 mm, in order to obtain seal-supporting qualities, but self-supporting steel sheets are so inflexible that the compensator required a bellows formation. The production of bellows is costly, however, particularly in view of the large cross-sections which are involved in steel compensators. An even greater disadvantage is that the steel sheet insert must be welded in a gastight manner, since it forms the sealing element. The assembly and installation of such compensators are thereby rendered considerably more difficult and, in numerous cases, practically impossible.

SUMMARY OF THE INVENTION

It is an object of the present invention to provide a compensator of pliable material which has the relatively unrestricted flexibility of a fabric compensator, but yet can be produced at a reasonable cost.

It is a further object of the present invention to provide a compensator of the above type which has a substantially greater chemical, thermal and/or mechanical stability when compared with known compensators of pliable material.

In accordance with the present invention there is provided a compensator of pliable material for establishing a flexible joint in a pipe, comprising a sealing element of limited thermal stability, and at least one flexible layer of fabric material co-operating with the sealing element, in which a layer of flexible steel foil which has a thickness no greater than 0.05 mm, which is not load-bearing and which is arranged between the sealing element and at least one thermally and/or chemically stressed side of the compensator.

In contrast to the aforementioned compensators of pliable material comprising a steel sheet insert, the steel foil having a maximum thickness of 0.05 mm does not form the sealing element in the compensator in accordance with the invention. At least one sealing element of plastics material, rubber, aluminium and/or lead, and usefully a sheet of PTFE, is used for sealing the compensator. The steel foil serves the purpose of protecting this sealing insert and the fabric, and it is important that the steel foil is not self-supporting in view of its small thickness of at most 0.05 mm. A steel foil of this thickness is comparable to a cigarette paper regarding its intrinsic flexibility. Consequently, it does not in any way impair the flexibility of the compensator as a whole. The compensator may consequently have a fold-free configuration, and this is the most economical form of construction for fabric compensators.

The steel foil is preferably produced from stainless acid-proof steel. It may form a backing for a layer of textile material, or it may be incorporated as a loose insert.

By virtue of its neat uncomplicated structure, the compensator in accordance with the invention is suitable for use in the equalization of expansion and absorption of vibrations in circular and rectangular ducts for air, hot air, flue gases and analogous fluids. Furthermore, the possibility also exists of producing transitional elements between different cross-sections, for example at points where the cross-section changes from circular to annular, from oval to angular, and the like. The ranges of application are represented by pressures of up to approximately 1 atmosphere and peak temperatures of approximately 800° to 1000° C.

Woven or interlaced industrial fabrics, including fabrics of natural substances such as white or blue asbestos, synthetic substances, as well as glass or metal fibres, may be considered as suitable materials. Use may also be made of heat-proof mineral wools and felts. If the steel foil is applied in the form of a backing, it may be so applied on one or both sides of the heat-proof fabric.

Since the degree of flexibility of the compensators according to the present invention is similar to that of known compensators of pliable material, comprising fabric and polytetrafluoroethylene, it is possible to replace a compensator of known structure with an identically dimensioned compensator according to the invention.

The steel foil in the present invention acts as an excellent reflector for radiant heat. The sealing layer of the compensator, which has limited thermal stability, may consequently withstand unexpected temperature surges from inside as well as outside, without damage, and compensator failures are consequently reduced substantially.

On the inner side of a compensator for flue gases or the like, the steel foil may serve the purpose of a flame deflector in case of fire or analogous situations, which have frequently resulted in a total write-off of conventional compensators.

In cases where condensate is expected to form within the compensator, the steel foil offers an increased protection against drenching. The plastics material coatings customary until now, which were internally applied on blue asbestos fabrics for example, were unable to perform this task satisfactorily and only up to a temperature of approximately 300° C, particularly because of the hydroscopic properties of asbestos and other mineral fabrics. In contrast, it is possible to cope without real difficulty with temperatures of up to 600° C, when the highly elastic steel foil is provided as an internal lining. If need be, the compensator may be fully insulated by bilateral application of the steel foil, which is desirable for hygienic reasons, for example, in the food industry. As for the rest, the use of asbestos may be avoided, if so desired, while nevertheless obtaining a compensator which is impervious to flue gas or acid, whereof the flexibility is comparable to that of known asbestos fabric compensators.

The steel foil applied in accordance with the invention is non-porous and has a degree of strength which ensures that damage to the compensator during assembly is practically precluded if the foil is applied as an outer layer. The durability of the compensator is increased substantially in comparison with known compensators of pliable material.

Generally, compensators of pliable material may be fully assembled at the factory where they are produced, or they may be so constructed as open compensators where the final assembly occurs at the point of installation. In the latter case, the steel foil insert may have joints prepared for closure on site.

Compensators impervious to high temperature may moreover appropriately comprise, at the side of high thermal stress and as inner or outer layers, a looped wire fabric which incorporates one or more intermediate layers of insulating materials of high thermal stability, such as mineral wool or felt. These intermediate layers make provision for an adequate temperature gradient down to the sealing layer of low thermal stability. In this case also, the looped wire fabric ensures such a degree of flexibility that it is posible to avoid costly folds.

BRIEF DESCRIPTION OF THE DRAWINGS

Embodiments of the invention will now be described, by way of example, with reference to the accompanying drawings in which.

DESCRIPTION OF THE PREFERRED EMBODIMENTS

Figure 1:
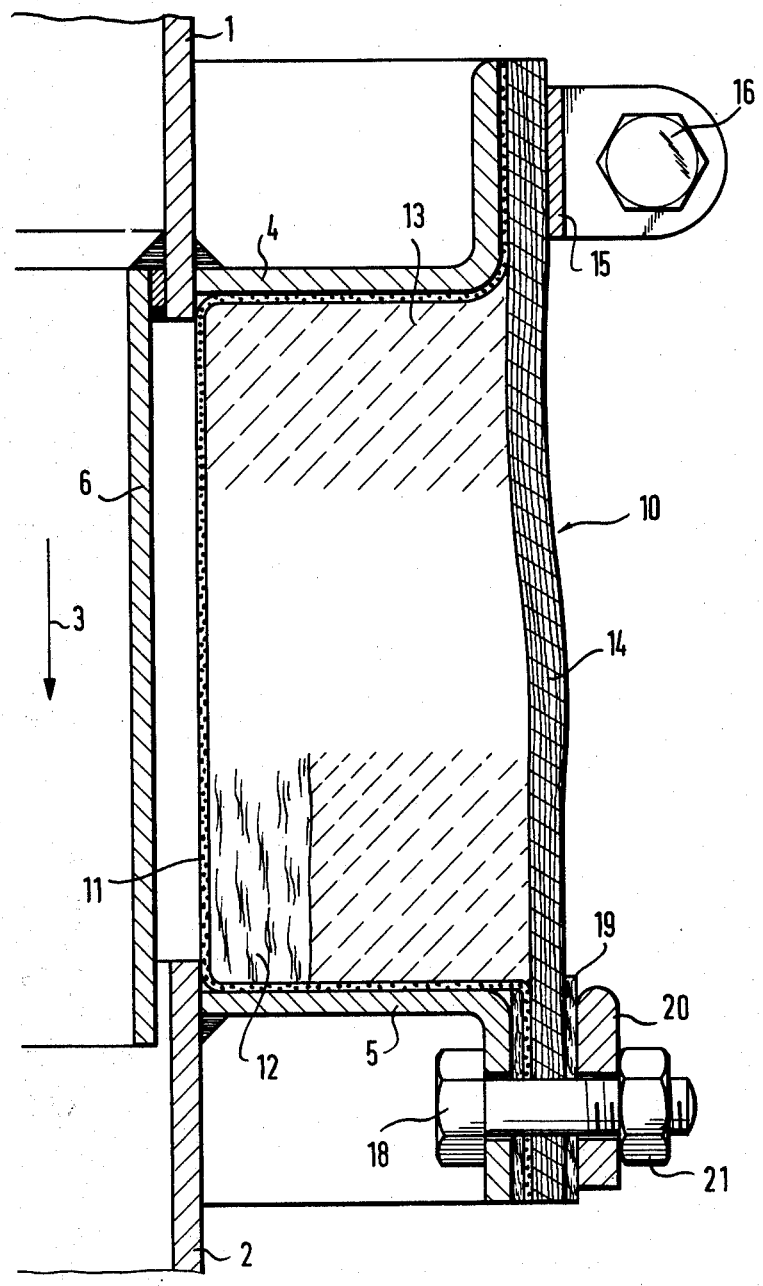
FIG. 1 is a fragmentary cross-section of an embodiment of a compensator according to the present invention which is impervious to high temperatures.

The compensator illustrated in FIG. 1 serves the purpose of connecting two ducts, the extremities of which are denoted by references 1 and 2. Arrow 3 shows the direction of flow in the duct. Flanges 4 and 5 are welded to the respective duct extremities, and the upstream duct extremity 1 carries a deflector ring 6 on its inner side.

The compensator is shown in general by the reference numeral 10 and has an inner layer consisting of a looped wire fabric 11 which borders a filling consisting of a felt layer 12 impervious to high temperature and a layer of mineral wool 13. Outwardly of the layer 13 is a succession of layers 14 including at least one steel foil having a maximum thickness of 0.05 mm and a sealing layer of limited thermal stability, such as a polytetrafluoroethylene sheet. The steel foil is located at the thermally stressed side of the compensator, that is closer to the interior of the ducts than the sealing layer. If thermal loads are expected on the outside of the ducts, in particular in the form of radiant heat, another steel foil is incorporated to enclose the sealing layer externally. One example of a sequence of such layers will be described in detail later.

The top end of the compensator is secured to the flange 4 by means of a band having lugs 15 which are held by means of a bolt 16. A different method of fastening is illustrated at the lower end of the compensator where bolts 18 traverse bores in the flange 5 and in the projecting end of the compensator. The bolts 18 also pass through a gripping reinforcement 19 and a flat band 20. By tightening the nuts on the bolts 18, the compensator is clamped between the fastening flange 5 and the band 20.

The layers 12 and 13 protect the sealing layer of the layers 14 primarily against thermal stresses which are transmitted by heat conduction and convection. Thermal radiation is blocked by the steel foil or steel foils which also offer protection against chemical and mechanical stresses.

The compensator of FIG. 1 has an assembly of layers 11 to 14 which has a substantial material thickness as a whole. However, a particularly high degree of flexibility, which renders folds superfluous, is assured by the specified combination of individual layers, in particular the extremely thin steel foil in conjunction with the looped wire fabric 11.

Figure 2:
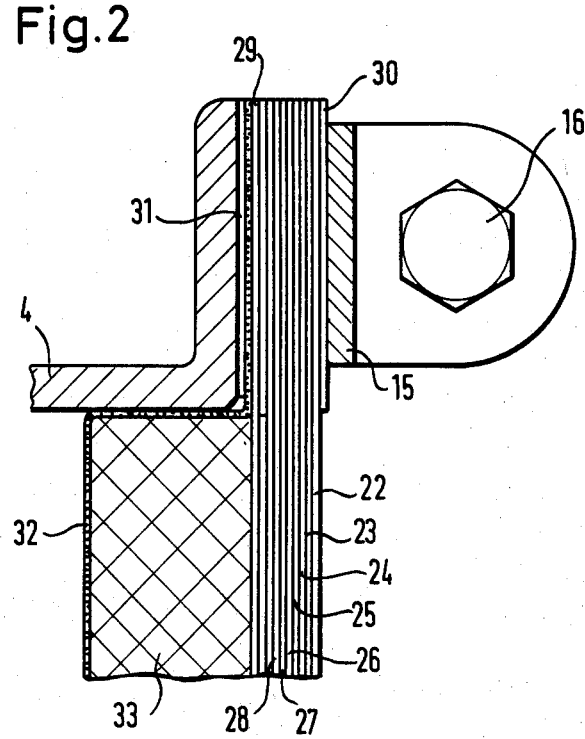
FIG. 2 is a fragmentary cross-section of another embodiment of a compensator according to the present invention in which the layer structure is particularly significant.

In the compensator illustrated in FIG. 2, the succession of layers 14 consists of the following materials from the outside to the inside; a nickel-cored white asbestos fabric layer 22, a layer 23 of reinforcing fabric, a polytetrafluoroethylene foil 24, a layer 25 of white asbestos fabric, a layer 26 of nickel-cored white asbestos fabrics, a steel foil 27 having a thickness of at most 0.05 mm, a layer 28 of reinforcing fabric, and a second steel foil 29 having a thickness of up to 0.05 mm. At the sides of the outer rim of the sequence of layers 14 are reinforcing members 30 and 31 of white asbestos fabric. Between the member 31 and the inner steel foil 29, is sandwiched the edge strip of looped wire fabric 32, and a layer 33 of mineral wool is located between the fabric 32 and the foil 29. The succession of layers 14 may have a total thickness of, for example, 18 mm.

Figure 3:
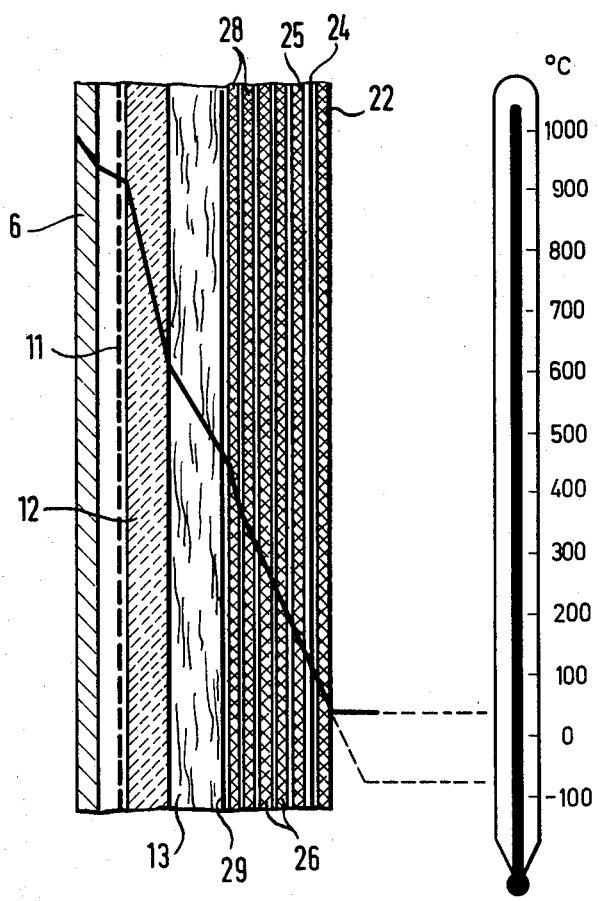
FIG. 3 is a detail section showing the layer structure of an open compensator according to the present invention.

FIG. 3 shows diagrammatically the temperature curve in the case of a compensator of the kind illustrated in FIG. 1 or FIG. 2. As will be apparent, the compensator elements situated at the thermally stressed side of the sealing element, in particular the polytetrafluoroethylene foil 24, must lower the temperature so that it lies well below the maximum permissible for the sealing element. Corresponding conditions apply for the other layers, meaning that the left layer 12 which is more impervious to high temperatures, lowers the temperature below the maximum temperature permissible for the layer of mineral wool, which, for its part, results in another temperature drop to below the permissible operating temperature for the asbestos or reinforcing fabrics 26, 28.

Figure 4:
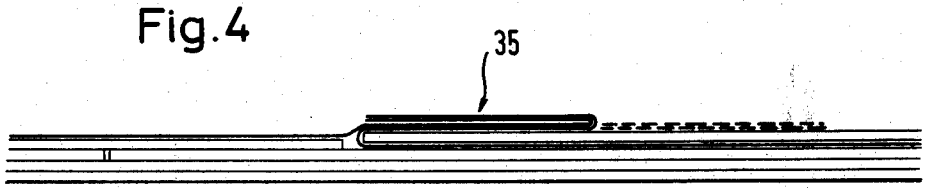
FIG. 4 shows the temperature diagram in the case of a compensator according to the invention.

For assembling open compensators, the steel foil is appropriately formed with prepared flaps which are folded together as shown at 35 in FIG. 4. The foil of polytetrafluoroethylene, serving the purpose of sealing, may also have its abutting edges folded together in a corresponding manner and glued together by means of a heat-proof adhesive.

What is claimed is:

1. A compensator of pliable materials arranged in a laminar fashion for establishing a flexible joint between sections of a pipe, comprising:
    a sealing layer of a fluid-impervious material having a limited thermal stability;
    a flexible layer of fabric material positioned adjacent to and on each side of said sealing layer; and
    a non-load-bearing layer of flexible, metallic foil positioned adjacent to said sealing and said flexible layers, said layer of flexible, metallic foil being disposed relative to said sealing and said flexible layers so as to protect said layers against a source of thermal and/or chemical stress.

2. A compensator of pliable materials according to claim 1, wherein said layer of flexible, metallic foil is steel and has a thickness no greater than 0.05 mm.

3. A compensator of pliable materials according to claim 1, further including a second, non-load-bearing layer of flexible, metallic foil positioned adjacent to and on the side of said sealing layer opposite from said layer of flexible, metallic foil.

4. A compensator of pliable materials according to claim 1, in which said layer of metallic foil is provided with folded end flaps which engage each other when the compensator is attached to the pipe sections.

5. A compensator of pliable materials according to claim 1, further comprising:
    at least one, intermediate layer of heat-resistant, insulating material positioned adjacent to said layer of flexible metallic foil; and
    a looped-wire fabric juxtaposed to said heat-resistant, insulating material at the side of said compensator exposed to high thermal stresses.

6. A compensator of pliable materials according to claim 5 wherein said heat-resistant material is mineral wool.

7. A compensator of pliable materials according to claim 5 wherein said heat-resistant material is felt.

* * * * *